United States Patent [19]

Geise et al.

[11] Patent Number: 4,880,194

[45] Date of Patent: Nov. 14, 1989

[54] APPARATUS AND METHOD FOR SUPPORTING ARTICLES

[76] Inventors: John Geise, 4433 Kill Rd., Delphos, Ohio 45833; Lynn Niese, 4680 Alabama Ave., Navarre, Ohio 44662

[21] Appl. No.: 76,203

[22] Filed: Jul. 21, 1987

[51] Int. Cl.[4] .......................................... F16M 11/38
[52] U.S. Cl. ................................... 248/166; 211/200; 248/176; 248/463; 269/296; 269/901
[58] Field of Search ...................... 248/166, 176, 163.1, 248/460, 463, 454, 457, 122; 269/296, 88, 901; 211/200

[56] References Cited

U.S. PATENT DOCUMENTS

| | | | |
|---|---|---|---|
| 811,448 | 1/1906 | Shellenberger | 269/296 X |
| 836,551 | 11/1906 | Werner | 248/166 X |
| 1,065,979 | 7/1913 | Spencer | |
| 1,127,969 | 2/1915 | Dolder | 269/296 X |
| 1,792,612 | 2/1931 | Staley | 269/296 X |
| 2,311,668 | 2/1943 | Kennedy | 248/176 X |
| 2,335,692 | 11/1943 | Murray | 269/296 X |
| 2,536,239 | 1/1951 | Tyndall | 269/296 X |
| 2,793,426 | 5/1954 | Lamb et al. | 29/288 |
| 3,060,917 | 10/1962 | Dickey | 125/35 |
| 3,598,390 | 8/1971 | Armitage | |
| 4,102,065 | 7/1978 | Selden | 248/122 X |
| 4,239,197 | 12/1980 | Olstad | 269/296 X |
| 4,619,446 | 10/1986 | Yang | 269/88 |
| 4,691,885 | 9/1987 | Lawrance | 248/460 X |
| 4,714,224 | 12/1987 | Calmes | 248/164 X |

FOREIGN PATENT DOCUMENTS 373710  6/1932  United Kingdom ................ 248/166

OTHER PUBLICATIONS

"Do-All Space Saver," brochure, Geise Manufacturing Co., Delphos, Ohio, 9-1986.

Primary Examiner—Ramon S. Britts
Assistant Examiner—David L. Talbott
Attorney, Agent, or Firm—Renner, Kenner, Greive, Bobak, Taylor & Weber

[57] ABSTRACT

An apparatus and method for maintaining articles such as automotive body parts, appliance body parts, tools, windows, masonry supplies and equipment, panelling, roofing material, and the like in an appropriate position for receiving service such as reconditioning, measuring, cutting, sanding, painting and the like. This apparatus selectively collapses for storage or shipment, and selectively opens to provide an easel-like support frame as well as multiple horizontally disposed support frames for servicing such articles.

2 Claims, 4 Drawing Sheets

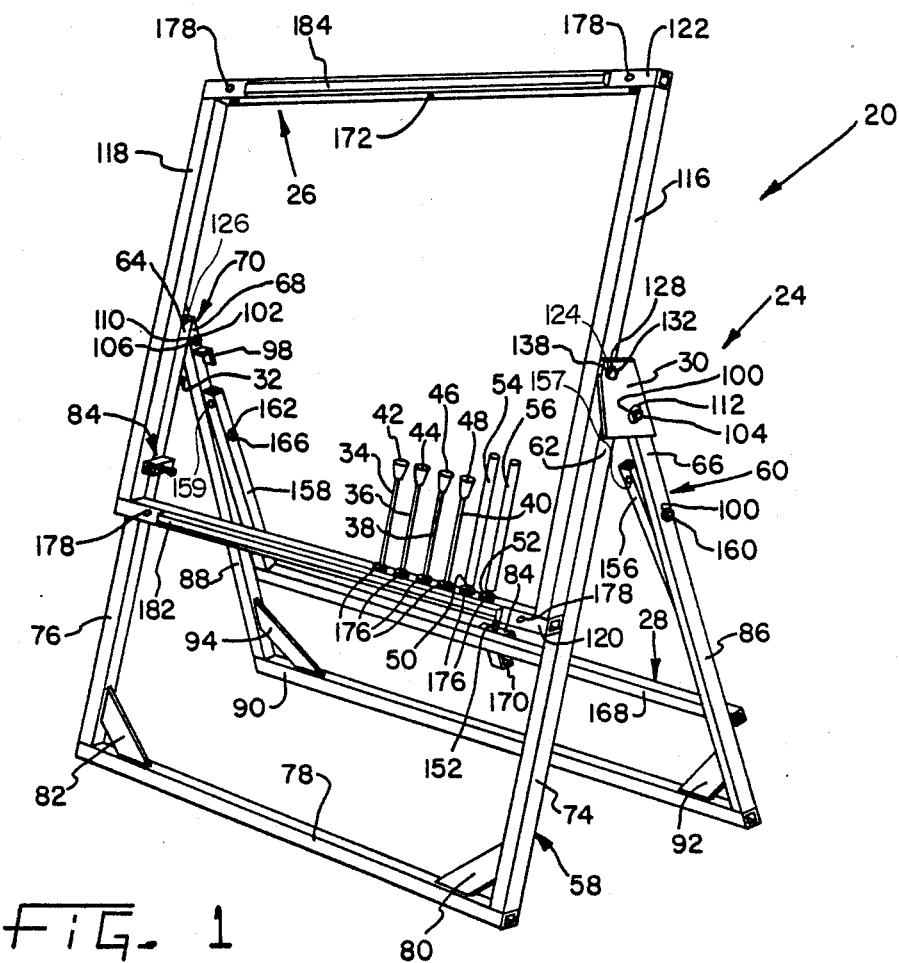
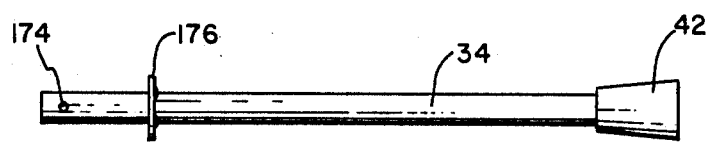
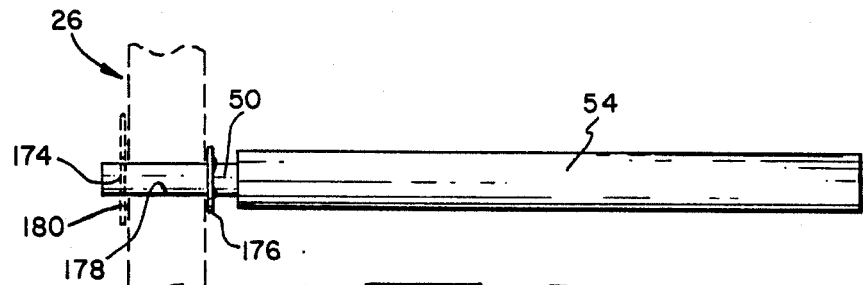

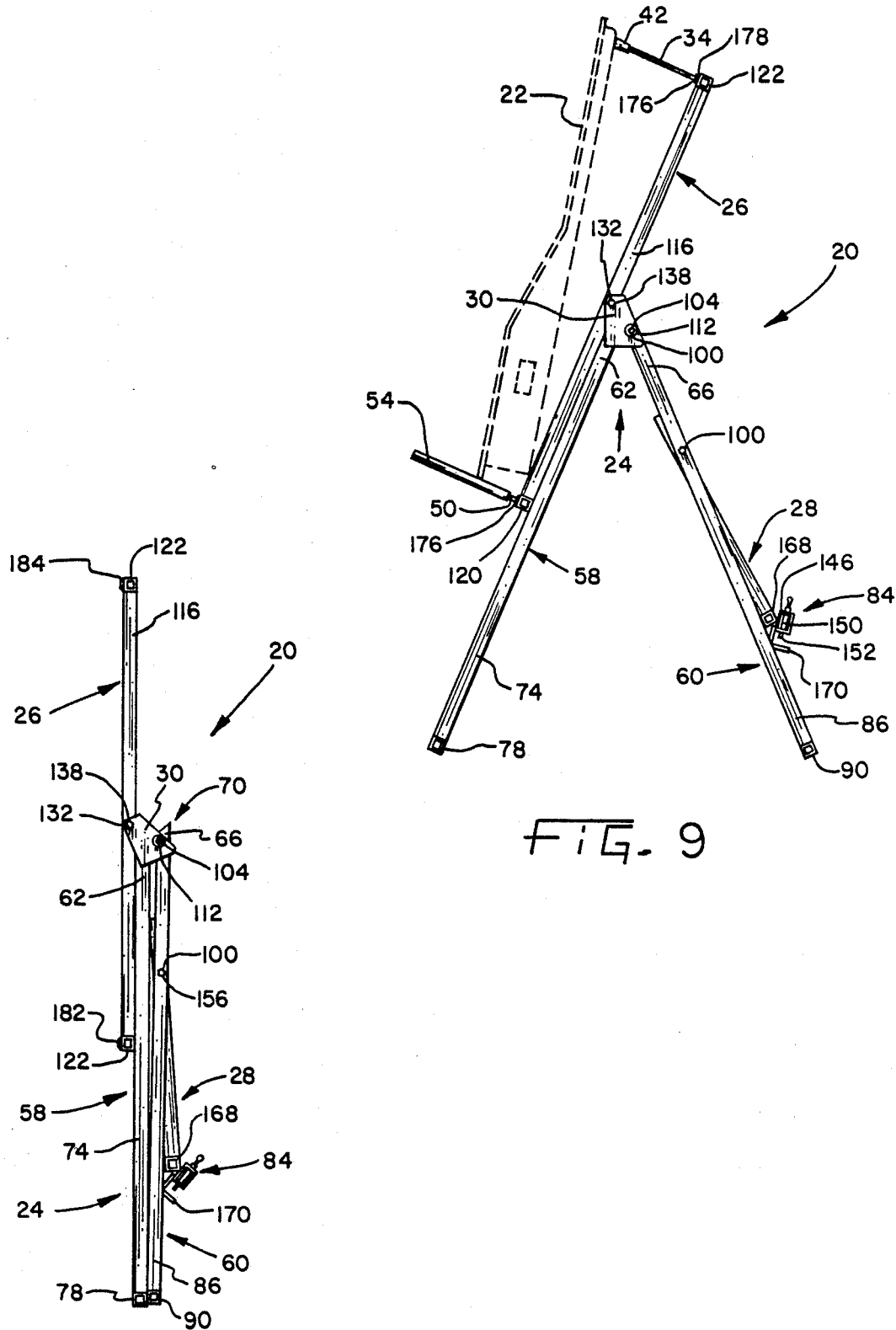

APPARATUS AND METHOD FOR SUPPORTING ARTICLES

BACKGROUND OF THE INVENTION

This invention relates generally to an apparatus for supporting articles such as automotive body parts, appliance body parts, tools and the like, to receive service, and more particularly to a convertible apparatus providing multiple positions, horizontal as well as easel-like, to support such articles.

In general, body parts are large, cumbersome and awkward to handle when in need of repair. This is the case for most body parts including automotive, appliance and the like. Because of their weight, such body parts require a support apparatus capable of withstanding the additional stress caused by servicing operations while maintaining the body part in position without damaging the part.

Repair shops for body work often use readily available surfaces as a "make-do" support system. Often this results in a collapse of the system due to the weight and or awkwardness of the part as well as from the type of stress applied while reconditioning such part. Therefore, there exists a need for an apparatus designed to provide a strong, stable support to hold body parts in a variety of horizontal as well as easel-like positions while applying additional stress to such supported body part.

U.S. Pat. No. 4,268,020 issued May 19, 1981 to Wood, recognized the need for providing support for repairing body parts. This reference discloses a collapsible device for supporting automotive body parts either horizontally or in a substantially vertical position. The device teaches brackets to hold the body part in such a vertical position on the device. As a result the device lacks the stability demonstrated in the present invention.

Consequently, a need exists for an apparatus capable of maintaining large, unwieldy body parts on either a fixed horizontally disposed support or on a fixed easel-like support which can be readily collapsed for storage.

SUMMARY OF THE INVENTION

The present invention provides an improved convertible support apparatus designed to satisfy the aforementioned needs. Servicing large, awkward, cumbersome body parts is expedited by a strong support apparatus having the stability to overcome additional stress applied to it by the service rendered such as sanding, bending, painting, and the like to the part supported on the apparatus. This entire apparatus can be easily collapsed for storage in a space having minimum depth, and it opens to stand sturdily in a functional mode.

The sturdiness of this invention is accomplished by the offset type hinge system at the top of the base member. The top ends of the rear leg members are offset in relation to the top ends of the front leg members. The rear leg members are pivotally attached to a plate member to which the front leg members are secured. This novel arrangement permits the rear legs a limited pivotal movement between a closed position for storage and a restricted open position for use.

The plate member also pivotally connects one of the tiltable support frames to the base member. Simple window latch pins are used to secure the support member against the front leg members in an easel-like position, and altenatively to secure the support member in a horizontal position to a bracing member. These window pin latches effectively replace more expensive, complicated and less efficient latch systems.

The tiltable bracing member provides additional security to the horizontally disposed support member by extending under the lateral members of the support member. This feature, added to the offset hinge system of the leg members, provides a strong counterbalance to external forces exerted by servicing a large heavy body part. Thus the apparatus has the stability required for servicing large articles.

This invention is a system of cooperating frame members to provide a unique support system for repairing large articles. The frame members are made of a heavy-gauged material such as square steel tubing for rigid, light-weight components.

It is an object of this invention to provide a strong secure support for repairing articles such as body parts.

It is another object of this invention to provide an improved work rack for repairing large articles.

It is still another object of this invention to provide an apparatus with pivotal members for selectively supporting articles in one of substantially horizontal and substantially vertical positions.

It is yet another object of this invention to provide a portable, tiltable, and convertible support member for positioning articles for repair.

It is a still further object of this invention to provide a portable, convertible work rack which can be selectively collapsed for storage.

It is yet another object of this invention to provide a strong support apparatus having the flexibility to support articles securely either horizontally or vertically.

The above-mentioned and other features and objects of this invention, and the manner of attaining them will be more apparent from the following description, the claims and the appended drawings.

BRIEF DESCRIPTION OF THE DRAWINGS

In the accompanying drawings, like reference characters refer to the same or similar parts throughout the views:

FIG. 1 is a perspective view of the apparatus;

FIG. 2 is a side view of a support rod;

FIG. 3 is a detailed view of another support rod inserted in the apparatus;

FIG. 9 is a side elevation of the apparatus in a substantially vertical position; and FIG. 10 is a side elevation of the apparatus in a storage position.

DETAILED DESCRIPTION OF A PREFERRED EMBODIMENT

Figure 4:
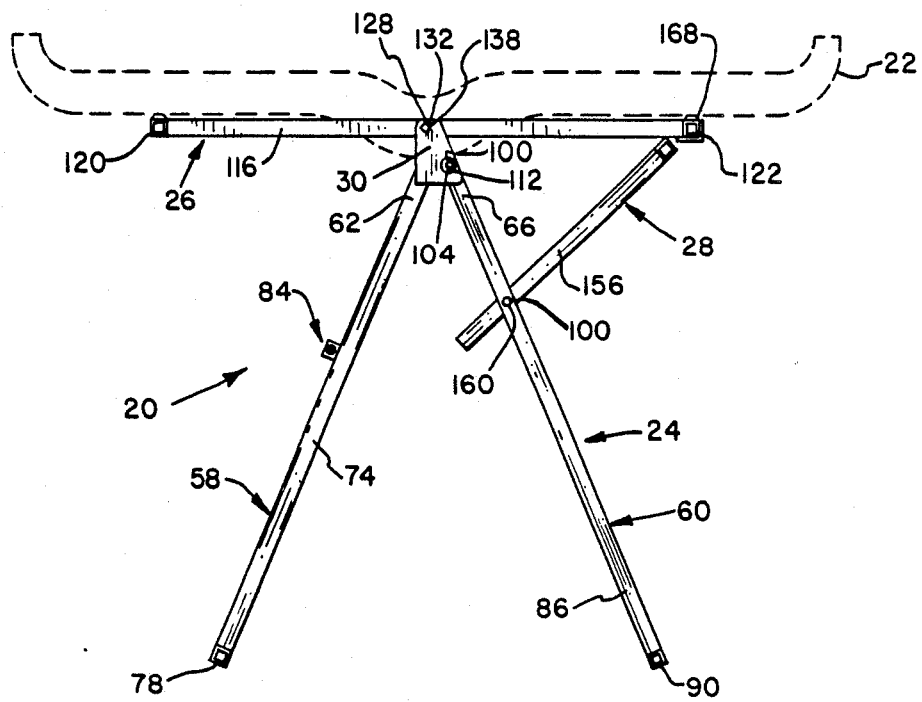
FIG. 4 is a side elevation of the apparatus in a horizontal mode.
Figure 5:
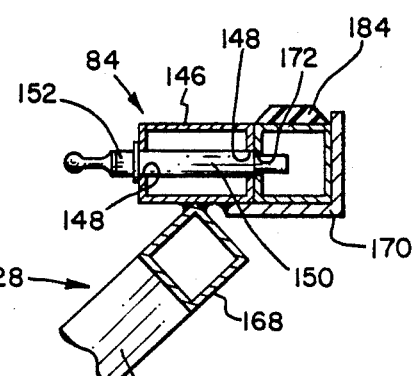
FIG. 5 is an enlarged fragmentary view partially in vertical section on a line corresponding to line 5—5 of FIG. 4.
Figure 6:
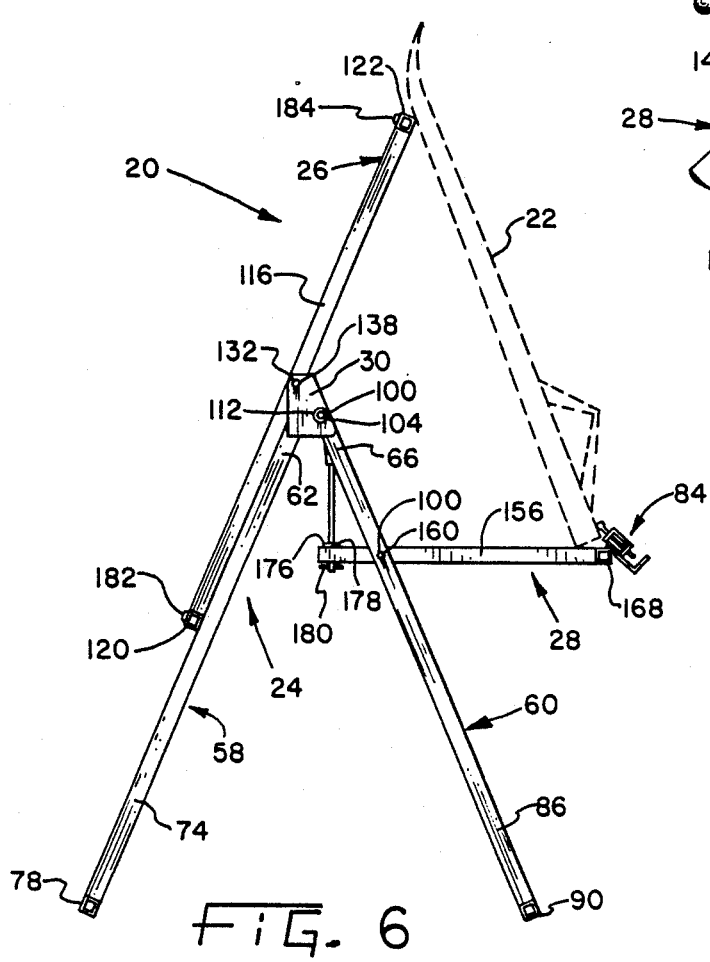
FIG. 6 is a side elevation of the apparatus in a multi position mode.

Referring now to the drawings, and more particularly to FIGS. 1, 4, 6, 9 and 10 there is shown the apparatus, generally designated 20, for supporting articles, represented by broken lines 22, in position for reconditioning. The apparatus 20 basically includes a base member 24, a first support member 26, a second support member 28, plate devices 30 and 32 for connecting the base member 24 to the first support member 26, first support rod elements 34, 36, 38 and 40 each bearing cap members 42, 44, 46 and 48 respectively, and second support rod elements 50 and 52 each bearing sleeve members 54 and 56, respectively, in axial alignment thereon. Cap members 42, 44, 46 and 48 and sleeve members 54 and 56 being of a suitable composition material capable of providing a cushion effect, preventing skidding of an article, therefore, and metal to metal contact, and the like.

Figure 7:
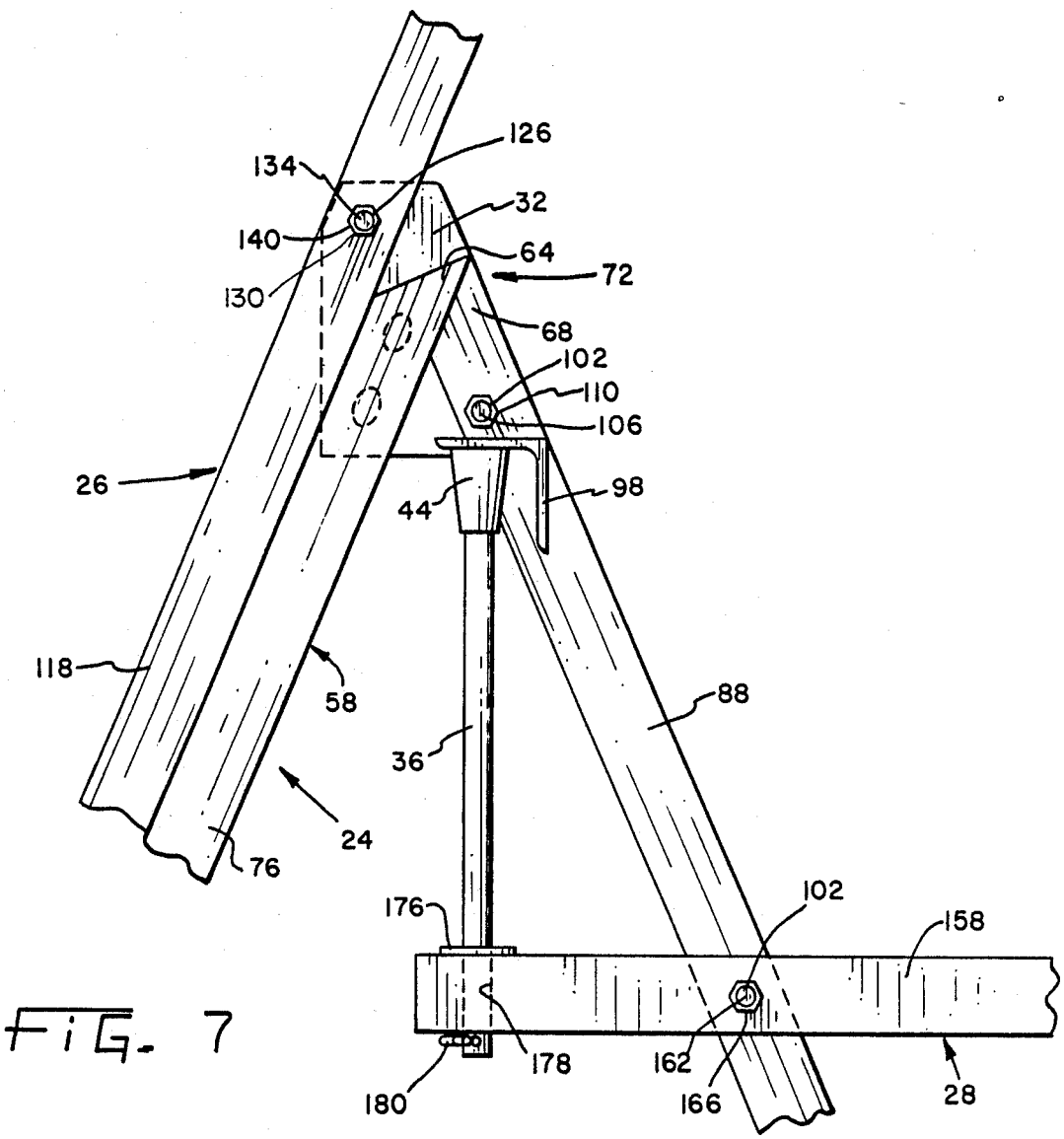
FIG. 7 is an enlarged fragmentary view of a joining system.

Referring to FIGS. 1, 9 and 10, the base member 24 includes a first frame member 58, and a second frame member 60. First frame member 58 has upper ends 62 and 64, and second frame member 60 has upper ends 66 and 68. Upper ends 66 and 68 being offset in relation to upper ends 62 and 64, whereby upper ends 62 and 66 converge in hinge system 70 (FIG. 1) and upper ends 64 and 68 converge in hinge system 72 (FIG. 7). Such hinge systems 70 and 72 provide an effective counterbalance of forces which increases the stability of apparatus 20.

Figure 8:
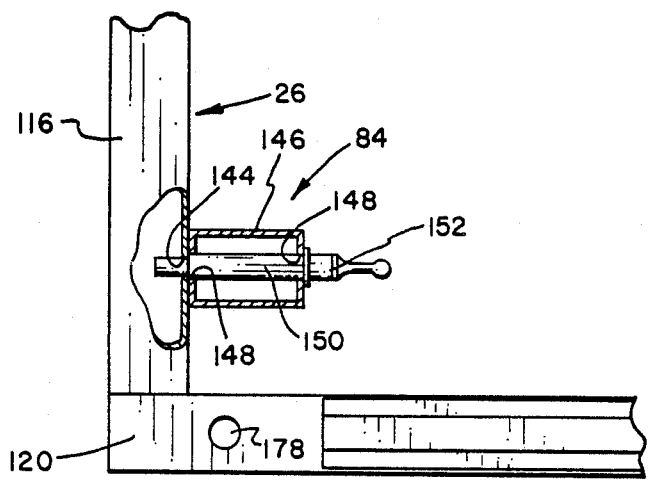
FIG. 8 is an enlarged fragmentary view of a securing device.

The first frame member 58 further includes substantially vertically disposed spaced-apart elements 74 and 76 having upper ends 62 and 64, respectively, bottom element 78, brace members 80 and 82, and a securing device 84. Upper ends 62 and 64 are secured to plate devices 32 and 34, respectively in any suitable manner such as welding. Securing device 84 can be any suitable system such as the spring-biased window pin system shown as securing device 84 (FIG. 8).

The second frame member 60 includes substantially vertically disposed spaced-apart elements 86 and 88 having upper ends 66 and 68, respectively, bottom element 90, brace members 92 and 94, bracket elements 96 and 98 (only bracket 98 shown), a plurality of apertures 100 and 102 disposed in vertically disposed elements 86 and 88, respectively, and pivot pins 104 and 106, respectively. Nuts 108 and 110 and washer-like elements 112 and 114 respectively secure pivot pins 104 and 106 respectively through plate devices 30 and 32 respectively and side elements 86 and 88 respectively.

Brace members 80 and 82, 90 and 92 are secured to frame members 58 and 60, respectively, in any suitable manner such as welding. Brace members 80 and 82 maintain the integrity of the angular relationship between opposite ends of bottom element 78 and vertical elements 74 and 76. Brace members 90 and 92 maintain the integrity of the angular relationship between bottom element 90 and vertical elements 86 and 88.

First support member 26 includes lateral members 116 and 118 held in spaced relation by cross members 120 and 122. Opposite ends of cross members 120 and 122 are secured to lateral members 116 and 118 by any suitable securing means such as welding. Lateral members 116 and 118 have apertures 124 and 126, respectively.

Plate devices 30 and 32 have apertures 128 and 130, respectively, to align with apertures 124 and 126, respectively for receiving pivot pins 132 and 134, respectively. Nuts 136, 138, 140 and 142 secure pivot pins 132 and 134, respectively, to pivotally connect the first support member 26 to base member 24. This pivotal connection permits first support member 26 to be moved easily between a subtantially horizontal position and a substantially vertical easel-like position to accommodate articles of various sizes and shapes such as automotive parts, and the like which require service such as sanding, straightening or painting.

FIG. 8 particular illustrates securing device 84 received within an aperture 144 on lateral member 116. Aperture 144 being aligned to cooperate with securing device 84 for securing first support member 26 to base member 24. Securing device 84 includes a housing 146 having a pair of aligned apertures 148 therethrough, a sleeve member 150, a spring (not shown) and a pin 152. Housing 146 is attached to first frame member 58 so that apparatus 146 aligns with aperture 144. Sleeve member 150 extends through apertures 148 and contains the spring. Pin 152 extends through the spring in sleeve member 150 and is spring-biased to extend through aperture 144 for securing the first support member 26 in a substantially vertically disposed easel-like position on base member 24. Additionally, bracing for maintaining the first support member 26 is accomplished by supporting lateral members 116 and 118 by vertically disposed elements 74 and 76, rspectively of base member 24.

Referring now to FIGS. 4–7 and 10, second support member 28 includes arm members 156 and 158 with apertures 157 and 159, respectively. Arm members 156 and 158 are pivotally connected to side elements 86 and 88, respectively by pivot pins 160 and 162, respectively. Nut-like members 164 and 166 maintain pivot pins 160 and 162, respectively in position through arm members 156 and 158, respectively, and through vertical elements 86 and 88, respectively. Arm members 156 and 158 are held in spaced relation by brace member 168.

A second securing device 84 has a bracket member 170 extended opposite one side thereof. Second securing device 84 is shown attached intermediate opposite ends of brace member 168. When first support member 26 is horizontally disposed, bracket member 170 cooperates with second securing device 84 to receive cross member 122 therein. Cross member 122 has an aperture 172 (FIGS. 1 and 5) intermediate opposite ends of cross member 122. Aperture 172 aligns with aperture 146 to receive pin 152 of second securing device 84. In addition, the opposite ends of brace member 168 extend under the horizontally disposed lateral members 116 and 118 to provide increased support for first support member 26. This novel arrangement effectively counterbalances the stress placed on this invention when it is used in its table-top mode, i.e., with the first support member 26 in its virtually horizontal position.

Referring more specifically to FIGS. 1–3, 6, 7 and 9, each one of opposite ends of first support rod elements 34, 36, 38 and 40 second support rod elements 50 and 52, has a hole 174 (FIGS. 2, 3, 6 and 7) therethrough, and a flange portion 176 intermediate said hole 174 and one of said cap members 42, 44, 46 and 48, and one of said sleeve members 54 and 56. First support member 26 and second support member 28 have a plurality of apertures 178 each adapted to releasably receive one of said first support rod elements 34, 36, 38 and 40 or one of said second support rod elements 50 and 52. One of a plurality of securing pins 180 releasably extends through the hole 174 to maintain the support rod element such as support rod element 36 in position through one of apertures 178. Securing pins 180 can be any suitable type securing pin such as a cotter pin.

FIGS. 1, 4–6 and 10 indicate buffer strips 182 and 184 mounted on cross members 120 and 122, respectively. Buffer strips can be of any suitable composition molding-type material which provides both a cushioning effect and a relatively nonskid surface which will prevent metal to metal contact between an article 22 and the apparatus 20. The buffer strips 182 and 184 as well as the first support rod elements 34, 36, 38 and 40 with cap members 42, 44, 46 and 48, respectively, and the second support rod elements 50 and 52 with sleeve members 54 and 56, respectively, operate both to positioning the article 22 in a proper perspective for the services required, and to maintain the article 22 in such position while the article is receiving the service, and also prevent the article from receiving new mars or damage due to sliding to metal, metal contact, or the like. When the first support member 26 is secured in the substantially horizontal position with a set of first support rod elements 34, 36, 38 and 40 inserted therein with cap members 42, 44, 46 and 48, thereon, an article placed thereover will maintain its position without additional clamping even while extreme force is exerted against the article.

When the first support member 26 is secured in a substantially vertical position, i.e., an easel-like mode, the second support member 28 can be maintained in a substantially horizontal position by inserting one of first support rod elements 34, 36, 38, and 40 in at least one of apparatus 157 and 159 to be held within bracket elements 96 and 98 on base member 24. Bracket elements 96 and 98 restrict pivotal movement of second support member 28 when one of first support rod elements 34, 36, 38 and 40 are inserted in at least one of apertures 157 and 159 to stabilize the second support member 28 in a substantially horizontal position, i.e., in a shelf-like mode. Such additional shelf-like support can be used for holding additional small parts, trays, tools and the like.

The base member 24 and the first and second support members 26 and 28, respectively, can be of any suitably strong metal such as the tubular steel rods illustrated in the drawings. Thus the support apparatus 20 of this invention will have the strength required for supporting large unwieldy articles, but it will also be lightweight enough for ease of portability. The selectively pivotable frame system of apparatus 20 permits apparatus 20 to be selectively collapsed to a smaller depth for storage and shipping and the like.

While there have been described above the principles of this invention in connection with a specific apparatus, it will be clearly understood that this description is made only by way of example and not as a limitation as to the scope of the invention.

What is claimed is:

1. A multiposition apparatus for supporting articles such as automotive body parts, panels, doors, appliance parts, and the like for servicing, comprising:

a base member, having a bottom portion and a top portion, adapted to be selectively disposed in one of a storage position and a functional position, said base member including: spacedapart generally vertically disposed frame members including a first frame member and a second frame member each of said first frame member and said second frame member having at least one generally horizontally disposed bottom element and a plurality of generally vertically disposed elements having opposite upper ends and bottom ends, said bottom ends being connected to respective opposite ends of said bottom elements whereby said vertical elements are held in spaced relation by said bottom elements, upper portions of said upper ends of one of said first frame member and said second frame member being angularly offset with respect to said upper ends of the other one of said first frame member and said second frame member whereby said base member is selectively moveable between a storage position and a functional position in that said top portions of said first frame member and said second frame member converge together and limit movement of one of said first frame member and said second frame member away from the other of said first frame member and said second frame member;

plate means secured to said upper ends of one of said first frame member and said second frame member;

means for pivotally connecting said plate means to the upper end of the other of said first frame member and second frame member;

support means mounted on said base member and adapted for selective movement between a substantially horizontal position and a substantially vertical position, said support means comprising a first pivotal member and a second pivotal member whereby one of said first pivotal member and said second pivotal member braces the other of said first pivotal member amd said second pivotal member in said substantially horizontal position;

means for pivotally connecting said plate means to one of said first pivotal member and said second pivotal member whereby said first pivotal member and said second pivotal member is selectively pivotal between said substantially horizontal position and substantially vertical position; and means for selectively securing said support means in one of said substantially vertical position, and substantially horizontal position, and said securing means comprising a bracket means and a latch means one of said bracket means and said latch means being secured to one of said first frame member and said second frame member and the other of said bracket means and said latch means being secured to the one other of said first frame member and said second frame member, said latch means comprising a first latch member and a second latch member, one of said first latch member and said second latch member being secured to one of said base member and said support means and the other one of said first latch member and said second latch member being secured to the other one of said base member and said support means.

2. A method of supporting articles in position on a selectively tiltable support apparatus to receive service such as painting, reconditioning, sanding, measuring, and the like, which method comprises:

pivoting a base member from a closed, storage mode to an open, functional mode, whereby bottom end portions of said base member are spaced-apart;

pivoting a support member, having a plurality of apertures therethrough, to a substantially vertical position;

securing said support member to said base member;

inserting one of a plurality of support rod elements in selected ones of said plurality of apertures;

inserting at least one of said plurality of support rod elements in one of said plurality of apertures in a brace means;

pivoting said brace means to a substantially horizontal position whereby said at least one of said plurality of support rod elements is received in at least one bracket member secured to said base member; and mounting one of a cover element and one of said support rod elements on said brace means for supporting articles such as tools, equipment, and the like.

* * * * *